(12) United States Patent
Taliancich et al.

(10) Patent No.: US 9,065,917 B1
(45) Date of Patent: Jun. 23, 2015

(54) SYSTEMS AND METHODS FOR PROCESSING AND ROUTING COMMUNICATIONS

(75) Inventors: David Taliancich, San Antonio, TX (US); Sharon Fernandez, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 2100 days.

(21) Appl. No.: 11/747,735

(22) Filed: May 11, 2007

(51) Int. Cl.
H04M 5/00 (2006.01)
H04M 3/523 (2006.01)
H04W 40/00 (2009.01)

(52) U.S. Cl.
CPC .................... *H04M 3/5235* (2013.01)

(58) Field of Classification Search
CPC ...................... H04M 2201/12; H04M 2201/36; H04M 3/5233
USPC .......................................... 379/265.01–266.1
See application file for complete search history.

(56) References Cited

U.S. PATENT DOCUMENTS

| | | | |
|---|---|---|---|
| 6,330,326 B1* | 12/2001 | Whitt ...................... | 379/265.13 |
| 8,411,842 B1* | 4/2013 | Wu et al. .................. | 379/265.11 |
| 2005/0195960 A1* | 9/2005 | Shaffer et al. ............. | 379/265.02 |
| 2006/0062376 A1* | 3/2006 | Pickford .................. | 379/265.12 |
| 2006/0274758 A1* | 12/2006 | Busko et al. ............. | 370/395.21 |
| 2007/0116240 A1* | 5/2007 | Foley et al. ............... | 379/265.02 |
| 2008/0043983 A1* | 2/2008 | Waalkes et al. .......... | 379/265.02 |
| 2008/0075268 A1* | 3/2008 | Medina et al. ........... | 379/265.06 |
| 2008/0095355 A1* | 4/2008 | Mahalaha et al. ....... | 379/265.09 |
| 2008/0147470 A1* | 6/2008 | Johri et al. ......................... | 705/9 |
| 2008/0175372 A1* | 7/2008 | Brunet et al. ............. | 379/265.09 |
| 2008/0247534 A1* | 10/2008 | Steul ........................ | 379/266.07 |
| 2012/0204109 A1* | 8/2012 | Julia et al. ..................... | 715/716 |

OTHER PUBLICATIONS

Dynamic routing Policies for multi-skill call centers by Sandjai Bhulai.*

"LiveOps™—Networking the World's Work", [online]. LiveOps, Inc., 2007. [retrieved on May 9, 2007]. Retrieved from the Internet: <URL:http://www.liveops.com/technology_routing.html>, 2 pgs.

"Skill Set Scheduling—a Pipkins White Paper", [online]. Pipkins, Inc., 2006. [retrieved on May 9, 2007]. Retrieved from the Internet: <URL:http://www.pipkins.com/articles/skillset.asp>,4 pgs.

(Continued)

*Primary Examiner* — Fan Tsang
*Assistant Examiner* — Solomon Bezuayehu
(74) *Attorney, Agent, or Firm* — Joseph A. Fuchs; Nixon Peabody LLP

(57) ABSTRACT

Systems and methods to process communications received from a user are described herein. In one example, the system may include a communications handling module that receives communications from users and a routing decision engine that selects an agent to process the communication. In another example, the method may include, receiving a communication from a user, parsing their need from the communication, and processing the communication using the need and other needs. In a further example, the method may include anticipating a service or product that may be of interest to the user and servicing that during a single interaction with an agent, where the interaction was initiated by the user for another need.

11 Claims, 7 Drawing Sheets

(56) References Cited

OTHER PUBLICATIONS

"Symposium Call Center Server", [online]. Regents of the University of Michigan, 2007. [retrieved on May 9, 2007]. Retrieved from the Internet: <URL: http://www.itcom.itd.umich.edu/telephone/symposium.html>, 3 pgs.

Bhulai, S., "Dynamic Routing Policies for Multi-Skill Call Centers", [online]. 2004. [retrieved on May 9, 2007]. Retrieved from the Internet: <URL: http://www.math.vu.nl/~sbhulai/papers/pdf/WS2004-11.pdf>, 1-14.

Koole, G., et al., "An Overview of Routing and Staffing Algorithms in Multi-Skill Customer Contact Centers", [online]. [retrieved on May 9, 2007]. Retrieved from the Internet: <URL: http://www.math.vu.nl/~sapot/call-centers/overview.pdf>, 1-42.

Koole, G., et al., "Approximate Dynamic Programming in Multi-Skill Call Centers", *Proceedings, 2005 Winter Simulation Conference*, [online]. Retrieved, Dec. 2010 from the Internet: <URL: http://www.math.vu.n//~sapot/call-centers/wsc05.pdf>, 9 pgs.

* cited by examiner

SYSTEMS AND METHODS FOR PROCESSING AND ROUTING COMMUNICATIONS

TECHNICAL FIELD

This application relates to systems and methods that process communications and more particularly to systems and methods that dynamically process and route communications.

BACKGROUND

Customers demand more of the products and services they use than ever before. They insist that the companies they deal with on a regular basis provide them greater and greater levels of information and access. These companies are configuring and operating more and more complex systems that are capable of delivering highly integrated services to those customers. Some companies deploy and operate larger call centers with more agents in an effort to deliver highly integrated services to their customers.

For example, a customer requiring access to insurance information can call into a call-center and through a conversation with an agent service that insurance account. Changes are made to the account during the interaction between the agent and the customer. However, it may become necessary for the customer to be placed on hold. Typically these hold periods provide a less than ideal user experience to the customer. One response to this is to place more agents in a call center which can reduce the amount of time the customer waits for an agent to process them.

SUMMARY

In an embodiment, an apparatus to process communications includes a communications handling module which receives inbound communications from a user, and a routing decision engine to select an agent to process the communications using a present need and one or more unidentified needs. The apparatus may further include, in some embodiments, a user data store which maintains data that can be used to determine the one or more unidentified needs. In another embodiment, a method of processing a communication includes receiving an inbound communication from a user, parsing the user's present need from the communication, determining an unidentified need, and processing the communication using the combination of the two needs. In a further embodiment, a method of routing an inbound communication includes anticipating a service of interest to a user, addressing a present interest of the user, and servicing the service of interest. In some examples, the same agent that addresses the present interest also services the service of interest.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof and in which is shown, by way of illustration, specific embodiments in which the example method, apparatus, and system may be practiced. It is to be understood that other embodiments may be utilized and structural changes may be made without departing from the scope of this description.

Systems

Figure 1:
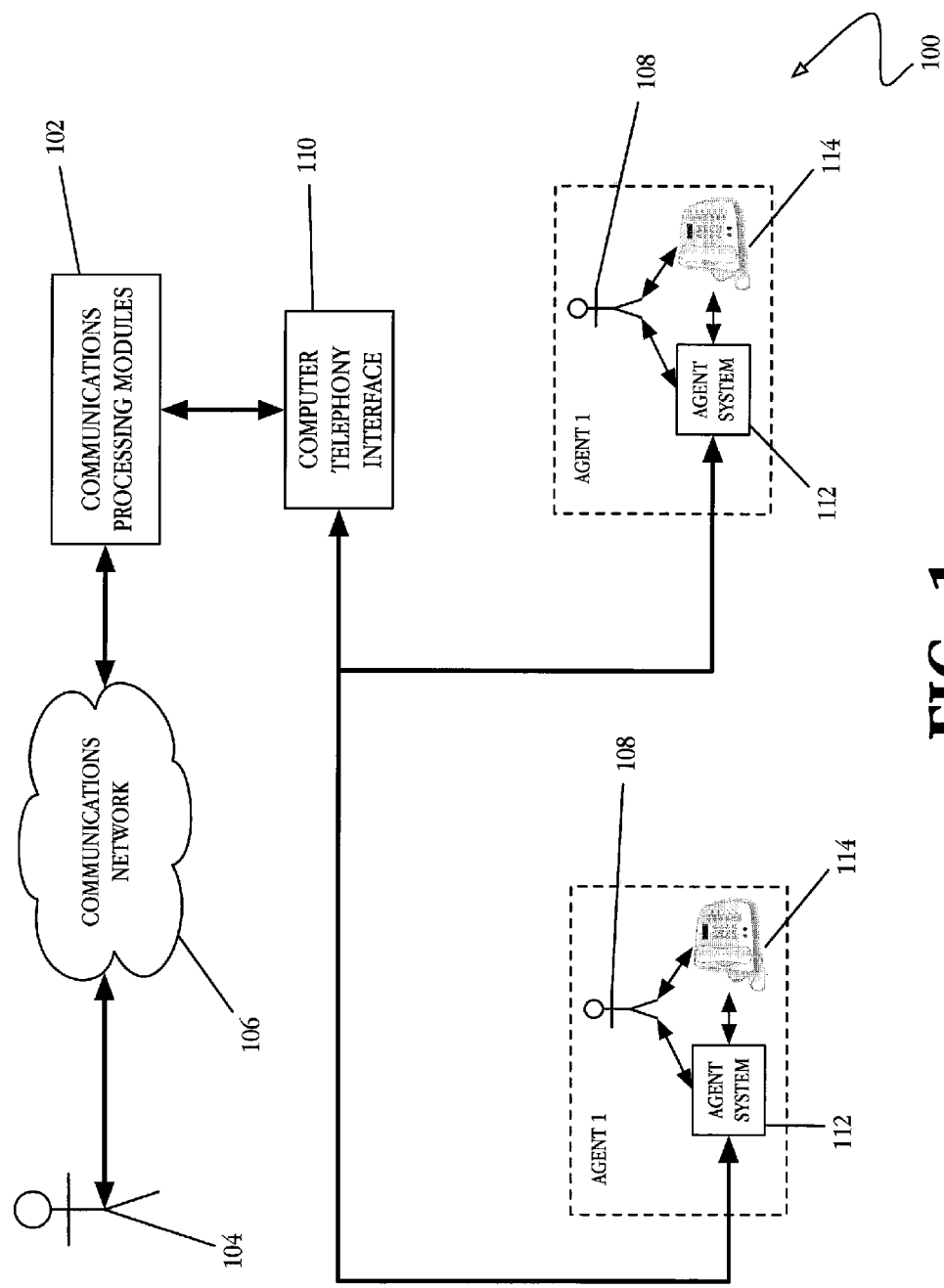
FIG. 1 shows a high-level block diagram of a system of processing communications received through a communications network, in accordance with an example embodiment.

FIG. 1 shows a high-level block diagram of a system of processing communications received through a communications network, in accordance with an example embodiment. The system 100 includes one or more communications processing modules 102 communicatively coupled to a user 104 through a communications network 106. The communications processing modules 102 are additionally coupled to one or more agents 108 through a computer telephony interface 110. The one or more agents 108 may interact with the computer telephony interface 110 through an agent system 112 or a telephone interface 114. In a further embodiment, the telephone interface 114 is controlled by the agent system 112 and the one or more agents interact with the computer telephony interface 110 through both the agent system and the telephone interface.

The system, in this example, provides a framework in which a user can identify a need to the system and have that need serviced by the agents communicatively coupled to the computer telephony interface. A grouping of agents are collectively known as a call center. As used herein, the entity that operates the computer telephony interface and the agents communicatively coupled to the computer telephony interface is described as the operator.

A user calls into the call center over a traditional phone switched telephone network (PSTN) and are routed through the computer telephony interface to an agent that can respond to that user's need. Though the term call is used and reference is made to a PSTN, the methods and systems are not limited in any manner and may include any type of interaction and communications network, without limitation. The term call is used as a short descriptor of any interaction between the user and an agent, or call center system. For example, the user may be calling to pay the balance due on their credit card. They would be routed to an agent in the accounts payable department, or its equivalent. This agent is trained and equipped to take payment over the phone and can attend to that need. Typically the computer telephony interface manages and routes calls depending on which agent is available to take a call. Operators of the system may seek to reduce the queue time, or the amount of time that the user has to wait to be attended to, by increasing the number of agents and intelligently routing the call to the agent who has the least number of pending calls. Alternatively, the computer telephony interface may queue all calls and forward, or route the call, to an agent when they are available.

However, in some situations, the user may need help with more than one item. Perhaps, they have to pay their credit card balance, but also wish to increase their credit limit. In this situation, two agents may become involved in the discussion. The first agent, in the accounts payable department, would be able to take payment over the phone, but would have to transfer the call to another agent, because the first agent was neither trained nor equipped to handle credit limit increase requests. In some situations this may mean that the user has to be placed in a second call queue and wait for another agent. However, it may, in the best case, mean that they are placed on hold by the first agent, while that agent calls the second agent and affects the transfer without the intervention of the computer telephony interface. In either situation, the user experiences some delay in their user experience. One way of overcoming this deficiency is to train every agent in the call center on all lines of business that the operator engages in. This may not be cost-effective, though an agent trained in all business areas of the operator could effectively deal with everything the user needs. However, as companies offer more diverse and wider product offerings to customers, the ability of a single person to deal with all of those needs is diminished. These business areas may include, without limitation, financial planning, life insurance, homeowner's insurance, automobile insurance, liability insurance, casualty insurance, health insurance, banking services, brokerage services, and the like. However, business areas, in the larger sense, encompass a product or service that can enhance the financial stability of the user.

The user 104, as discussed above, calls in to have their need taken care of. However, the user 104 may have one or more other needs that need to be addressed. For example, pay a credit card bill and update their billing address. Additionally, the user may have one or more other needs that they have not identified but that the agent may be able to address at that time. In one embodiment, the communications processing modules 102 can combine either the identified, or present need, of the user with needs that have not been expressed, or unidentified needs. These unidentified needs may also be called future needs, in that the need may be expressed sometime in the future. Additionally, the communications processing module s102 can be configured, in another embodiment, to anticipate a need for the user. An anticipated need is similar to that of an unidentified need in that both have not been positively identified by the user. In either case, the communications processing modules 102 may take information received along with the instant communication and derive some other need from it. By using that other information about or related to the user, the unidentified needs can be more accurately derived. For instance, with the user calling in to pay an overdue balance on a credit card, the communications processing modules 102 can read the account of the user and note that they are over their credit limit. By combining that information with the identified need to pay the overdue balance, the customer processing module 102 may derive that the user would find some utility in talking with an agent who is able to also increase their credit limit at the same time. In such an example, the agent that the communication is sent to would be able to receive payment for the overdue balance and take the application for the increase in the credit limit. Through this arrangement, the agent need only be trained in two areas, without regard to any other business areas. The communication, in this example, can then be routed to any agent who is trained in at least those two areas.

Figure 2:
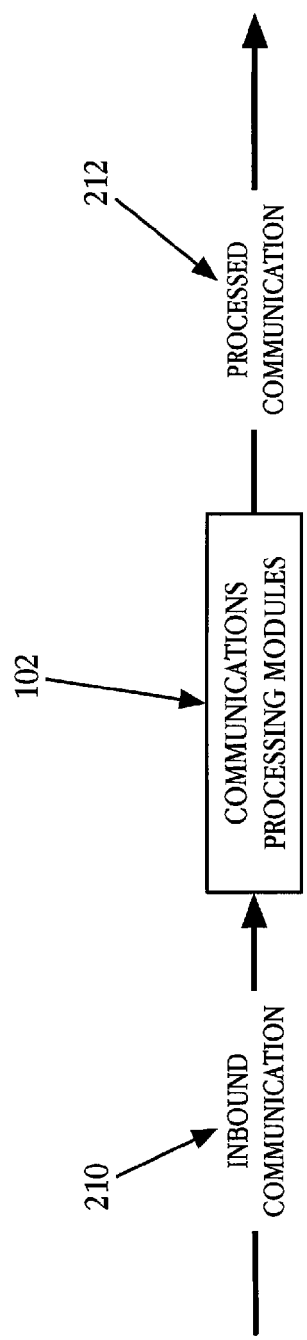
FIG. 2 shows a block diagram of an apparatus for processing communications, in accordance with an example embodiment.

FIG. 2 shows a block diagram of an apparatus for processing communications, in accordance with an example embodiment. In an embodiment, the communications processing modules 102 receive an inbound communication 210 as an input. The communications processing modules 102 output a processed communication 212. The processed communication 212 may include a routing decision, the routing decision denoting which agent or group of agents the inbound communication 210 should be routed to.

In an embodiment, the communications processing module receives an inbound communication 210 from a user. Inbound communications may include, without limitation, phone calls (PSTN communications), Voice over Internet Protocol (VoIP) communications received either over a computer network or through a PSTN, instant message communications received through a computer network and the like. Reference will be made within this application to calls as the inbound communication. This is not meant to be limiting in any manner, as calls is meant to incorporate any of the above communications methods. The communications processing module, through the operations described here, processes the inbound communication 210 by routing it to an agent. This may include a single agent or group of agents. In the latter, the first agent that is available could respond to the user. Routing the inbound communication 210 may include a decision as to which agent or group of agents should service the call. This may be done, in some examples, using just the identified, or present, need of the user. In further examples, the present need may be combined with one or more unidentified needs, and both used in combination to select, or decide, which agent should service the call.

Figure 3:
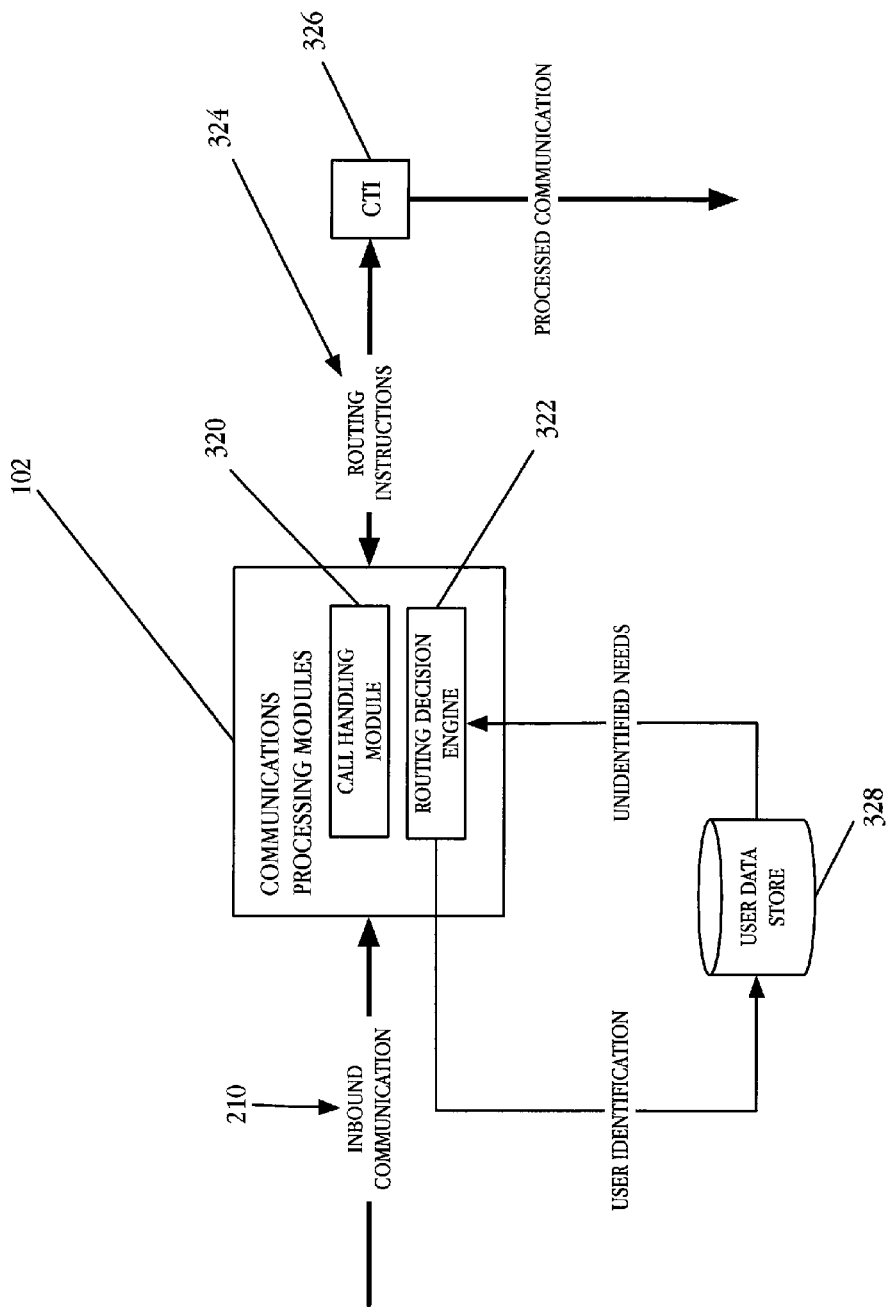
FIG. 3 shows a more detailed block diagram of an apparatus for processing and routing communications, in accordance with an example embodiment.

FIG. 3 shows a more detailed block diagram of an apparatus for processing and routing communications, in accordance with an example embodiment. In an embodiment, the communications processing modules 102 include a call handling module 320 and a routing decision engine 322. The communications processing modules 102 are additionally configured to output routing instructions 324 to computer telephone interface (CTI) 326. These instructions direct the CTI 326 to output a processed communication 326 according to the decisions calculated by the communications processing modules 102 as discussed here.

In an embodiment, the call handling module 320 is configured to receive an inbound communication 210 from a user. As discussed above, the inbound communication 210 may take many forms. The call handling module 320 is configured to receive the inbound communication 210 using any suitable communications method, either singly or in combination. In the former, separate call handling modules 320 could be operated that would handle the methods that the operator uses to interact with their customers. Additionally, the call handling module 320 may be configured to receive the inbound communication 210 through a web server application, wherein the user indicates a need to interact with an agent through a web page.

In an embodiment, the routing decision engine 322 is configured to select an agent to process the inbound communication 210. In a further embodiment, the routing decision engine 322 selects the agent using a present need and one or more unidentified needs of the user. The routing decision engine 322, in some examples, may be configured to send instructions to the call handling module 320 that are intended to cause the call handling module to route the inbound communication 210 to the selected agent. These instructions may include an address of the agent. The address includes any suitable destination address as used by the previously discussed communications methods. For instance, in the case of PSTN communication, the address would include a telephone number. In the case of VoIP communications, it may include a telephone interface, such as that used by a PSTN system, or an Internet Protocol (IP) address. In the latter example, the IP address may be a numerical address, such as 169.254.0.1, or a Uniform Resource Location (URL), such as www.home.com, which can be translated by a Domain Name System (DNS) into a numerical address. The numerical address provide as an example for an IP address is an IPv4 address, though this application is not limited to communications over an IPv4 network, and includes any other suitable IP network, such as an IPv6 network, or some combination thereof.

In one embodiment, the instructions received from the routing decision engine are passed to the CTI 326, wherein the CTI 326 will route the inbound communication 210 to the selected agent. The routing decision engine 322, in one example, processes information associated with the user that is suitable for determining the one or more unidentified needs of the user. The information suitable for determining the one or more unidentified needs of the user includes, without limitation, life events experienced by the user, status of financial accounts held by the user, age of the user, marital status of the user, number or presence of children, products or services not utilized by the user, products or services utilized by the user, and the like. This is not meant to be an exhaustive list, and is only meant to be illustrative. As used herein, any information that indicates a possible need for one or more financial, or insurance products or services is considered to be within the scope of the present discussion.

In a further embodiment, the routing decision engine 322 is configured to receive a user identification from the call handling module and query a user data store 328, which maintains data that can be used to determine the one or more unidentified needs of the user. This user data store may be a user profile data store, in some examples, and may incorporate direct information, or third party information, either individually or in combination. Direct information, as used herein, is meant to include any information obtained by the operator of the communications processing modules 102 as a result of a business relationship between the operator and the user. This may include, without limitation, past product or service purchases, lending or credit history, demographic information, product or service utilization, credit rating, and the like. Third party information, as used herein, is meant to include any information that the operator obtains regarding the user from sources other than the user. This may include, without limitation, product or service purchase history, customer information, and the like. This information may be obtained with the user's consent, in some examples. However information obtained without the express consent of the user may also be stored within the user data store. The direct or third party information may be specific to the user, or about one or more groupings associated with the user.

Information specific to the user includes information that is unique to the user, and includes individual account status, marital status, age, and the like. Information about one or more groupings includes what is referred to as demographic information. This is general information that can be used to model the needs of the user. For example, if the user is 75 years old, general information about retired persons could be included. Using this type of demographic information, generalities and assumptions about the user can be made. However, this information is not as valuable in some arrangements as specific information because assumptions and generalities do not take into account the individual user. For instance, in the example of a user who is 75, they may in fact be employed full-time and have different needs than someone who is 75 and retired. Predictions about the unidentified needs of the user can be made more accurately by combining both specific information and general information, either individually or in combination, the routing decision engine 322, or the user data store 328.

In a further embodiment, the user data store 328 can store, in addition to the information described above, one or more unidentified needs of the user. In such an example, the routing decision engine 322 queries the user data store 328 for such information and then the one or more unidentified needs of the user with the present need, as identified in the inbound communication 210, and selects an agent. This may include, without limitation, an agent that is capable of attending to all of those needs, or to a majority of those needs. It may also include an agent that can only respond to the present need, but is versed and knowledgeable about the one or more unidentified needs, though not capable of attending to them. One example of this is an agent who is knowledgeable about all products that a company offers, which may include investment opportunities. However, only licensed representatives can attend to investment needs, as required by federal regulations. In this example, the agent can inform the customer about the investment offerings of the company, but will have to transfer that call to another agent for further processing.

Methods

Figure 4:
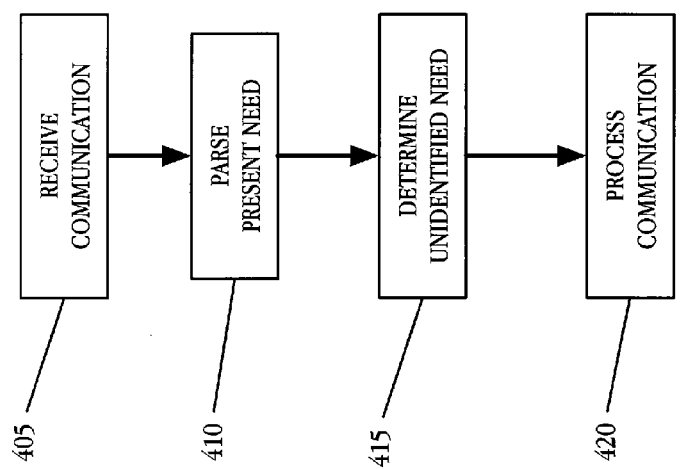
FIG. 4 shows a flowchart of a method for processing communications, in accordance with an example embodiment.

FIG. 4 shows a flowchart of a method for processing communications, in accordance with an example embodiment. In an embodiment, the operations depicted in FIG. 4 are carried out by the communications processing modules 102 discussed above.

At block 405, an inbound communication 210 is received from a user. The inbound communication may contain one or more identifications or indications, which may include user identification, need identification, location identification, number identification, and the like. At block 410, a present need is parsed from the inbound communication, if the present need is contained within the inbound communication. One example of this is a user indicating by pressing a number on their phone pad as to which service or product they need help with. In today's phone systems, this may take the form of "please press 2 if you need help with a banking product." In today's systems, the inbound communication is routed to a banking representative. Using the systems and methods described herein, the communication can be routed to an agent who is equipped to handle that need as well as others.

At block 415, one or more unidentified needs are determined. In one embodiment, the one or more unidentified needs are retrieved from a user data store, such as the user data store described above with respect to FIG. 3. This may include supplying the user data store with a user identification to the user data store, the user data store determining one or more unidentified needs using the user identification, and returning the one or more unidentified needs. Alternatively, user information may be retrieved from the user data store and the one or more unidentified needs determined through operations performed within the communications processing modules 102, such as performed by the routing decision engine described above with respect to FIG. 3. This information may include, in some examples, aggregated information. As discussed above, information may include both specific information and demographic information. Expanding on that information, aggregated information may also be included. This may incorporate demographic and specific information.

For instance, if the user is 75, specific information about all users who are 75 may be aggregated, or combined together. This aggregation can reduce the affects of users that are not within a normal distribution of characteristics so that a more accurate prediction of the needs of the instant user can be made. So, if one user who is 75 is employed full-time, their information can be normalized by the majority of 75 year old users who are retired.

At block 420, the communication received at block 405 is processed. This may include, in one example, selecting an agent using both the present need parsed at block 410 and the one or more unidentified need determined at block 415. The selected agent, in this example, is an agent that is capable of responding to both the present need and the unidentified need. Responding, in this context, includes, fully servicing the reasonable requirements of those needs. For example, if a present need is to pay a current amount due on a credit card, and the unidentified need is to obtain life insurance, the selected agent would be capable of not only receiving payment for the amount due, but to process the application for life insurance. Life insurance may require an application process that may, in some instances, require information that can not be obtained with a first phone call with the user. In such a scenario, the agent would be able to process the beginning of that operation. This example is only one of the many combinations, and is not limited to it, of an agent being able to handle a present need and one or more unidentified needs during the same interaction.

The agent selected above during the processing at block 420 is a cross-trained agent, in an example. A typical agent is trained with a single business area to service, such as banking. In businesses that supply one or more lines of business it is sometimes advantageous to not train all agents in all lines of business. However, a cross-trained agent can present a better user experience to the customers. One of the associated problems is that training an agent to respond to all needs of a customer for a business is typically cost-prohibitive. However, training across two or even three lines of business provides agents that can respond to multiple needs of the customer when they call in. Depending on the combination of the present need and the unidentified need, the agent selected could change. Such that a first agent could service a banking need and an insurance need, while a different agent would be required to service a banking need and an investment need.

Figure 5:
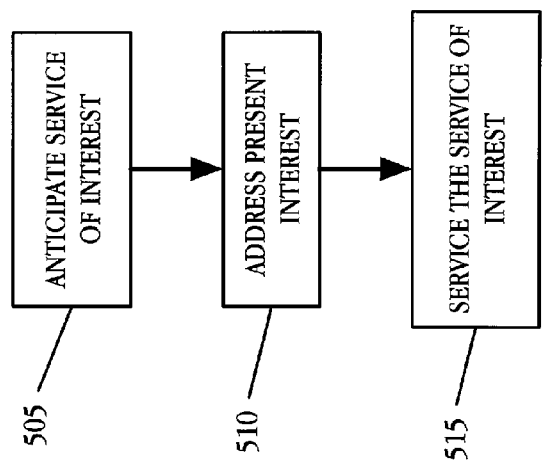
FIG. 5 shows a flowchart of a method of routing communications, in accordance with an example embodiment.

FIG. 5 shows a flowchart of a method of routing communications, in accordance with an example embodiment. The operations depicted in FIG. 5 may be carried out, in one embodiment, within communications processing modules 102 described above.

At block 505, the modules anticipate a service of interest. This is similar to an unidentified need described above, except the operations occur prior to a communication received by the user. For example, the routing decision engine described above may perform a periodic operation that determines services that may be of interest to users using information retrieved from the user data store. Alternatively, the user data store may store one or more services of interest within a data record associated with a user. These stored services of interest may be identified during prior interactions with the user, or may be determined using other information contained within the data record. In the former, a user may indicate during a first interaction that they would be interested in hearing more information about life insurance products, but does not have the time to discuss it. That information could be stored in the user data store, and retrieved during the anticipation operation at block 505. In the latter, the user data store may contain information that the user has recently had a baby. The anticipated service of interest may, in that case, be a college savings plan for that baby.

At block 510, a present interest of the user is addressed, through an interaction with a call center agent. During the same interaction with the same call center agent, in an embodiment, the service of interest anticipated at block 505 is service at block 515. Returning to the examples above of the life insurance need and the college savings plan need, this can be explained further. A present need addressed at block 510 could include the paying of an amount due on a credit card. The call center agent interacting with the user to address that need at block 510 would also be capable of servicing those other interests, the life insurance or the college savings plan, at block 515. A call center agent that is capable of servicing either the present need or the unidentified need is a call center agent that can, in most circumstances, attend to the entirety of the need within a first interaction with the user. However, there may be some circumstances where the user's needs, either present or unidentified, can not be satisfied within a first interaction, no matter how well trained the agent is.

In some cases, the service of interest or the present interest may require an interaction with an agent licensed by a regulatory agency to perform those operations. One example, without limitation, is investment needs. In such a situation, the agent selected would be an agent that was licensed to respond to the need that requires licensing. In some situations, the licensure requirement may be satisfied by licensing the computing system operated by the call center agent. In such an arrangement, the call center agent themselves would not be licensed, but by operating a licensed computing system, they can respond to and service that interest, or need, of the user.

Another example of call center agents that are capable of responding to more than one need of a user are those agents that are specifically tasked with interacting with customers that are at risk for termination of products or services. This may include, without limitation, new customers, customers who only use one product or service, or customers that are having trouble meeting one or more financial obligations. Each of these users may require special handling. In the first example, care can be taken to try and afford more services to the customer. By adding more products and services, the integration into the life of the customer becomes more pervasive and their risk for leaving decreases. In the second example, which is similar to the first, other services and products can be offered to the customer on a regular basis, again integrating more into the life of the customer. In the third and final example, the call center agent may have additional training to deal more effectively with the customer. This may include increased training with regards to debt counseling. By assisting the customer with their obligations, the risk of default is reduced. Further, by assisting the customer now with their problems, the possibility that they will be a long term customer is also increased.

Examples

Figure 6:
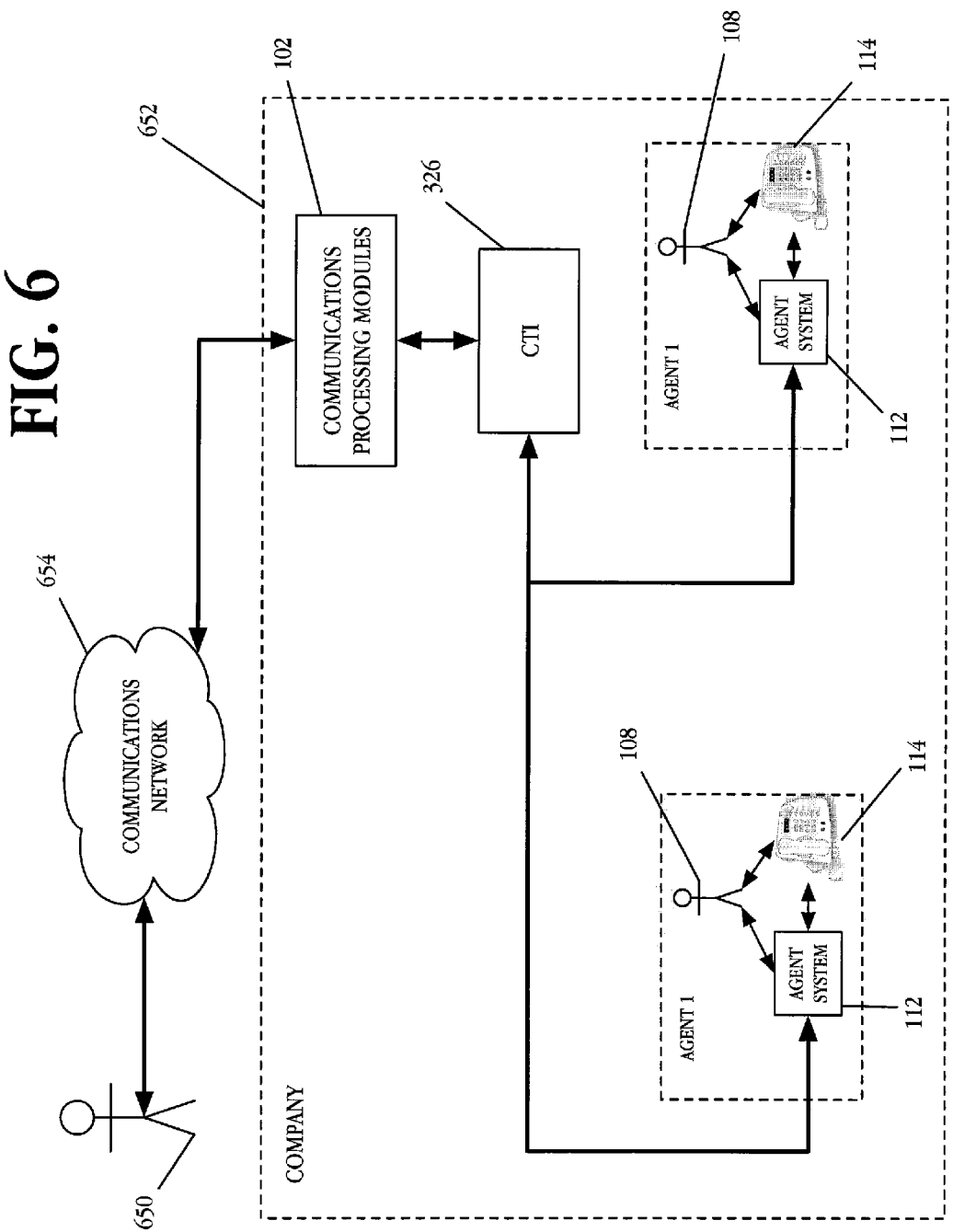
FIG. 6 shows a flow diagram of processing and routing communications, in accordance with an example embodiment.

FIG. 6 shows a flow diagram of processing and routing communications, in accordance with an example embodiment. The systems depicted in FIG. 6 and the operations described here are an example implementation of the systems and methods described above. In this example, a customer 650 is calling in to obtain auto insurance for a newly purchased van. The system and operations shown here have equal applicability to any variety of services that may require interaction with a call center agent. This may include, as well, a manufacturing company that offers a support line for new customers.

The customer 650 calls in to the company 652 to get insurance for an automobile. This may include a customer that has current auto insurance and is merely adding a new vehicle to their policy. It may also include a potential new customer who is comparing insurance offerings of many companies. In the latter example, it is advantageous to try and sell more than just a single product or service to that customer. By selling more than one product or service, the likelihood of keeping that customer long-term is increased. However, the systems and methods described above and further explained here by way of example, are equally applicable in both situations.

The communication received from the customer is received over a communications network 654. This may include, without limitation, a PSTN system, a VoIP system, or any other system that enables direct interaction between an agent and a customer. The communication is received at a communications processing modules 102. The communications processing modules 102 may be coupled to a CTI system, in one example. In an alternate example, the functionality of the CTI system may be performed by computing modules contained within the communications processing modules 102. In the former example, the communications processing modules 102 is configured to pass incoming communications to the CTI 326 and to send instructions to the CTI 326 with regards to the proper handling, or processing of the communication. In the latter example, the communications processing modules 102 routes the communication to the selected agent without first passing it to a functionally separate CTI 326.

In the example shown in FIG. 6, the communications processing modules 102, CTI 326 and the one or more agents 108 are all operated by a single company, or business. This is just one arrangement, however, and the methods and systems described are not restricted to just such an arrangement. For example, separate companies may provide each of the components depicted in FIG. 6.

Each of the agents interacts with the customer 650 through a telephone interface 114 or an agent system 112, or both, where the telephone interface 114 is communicatively coupled to the CTI 326 through the agent system 112. The agent system 112 may also provide to the agent 108 the ability to service the present and one or more unidentified needs of the customer 650. In such an example, the agent system 112 may be additionally coupled to other computing systems and devices.

Figure 7:
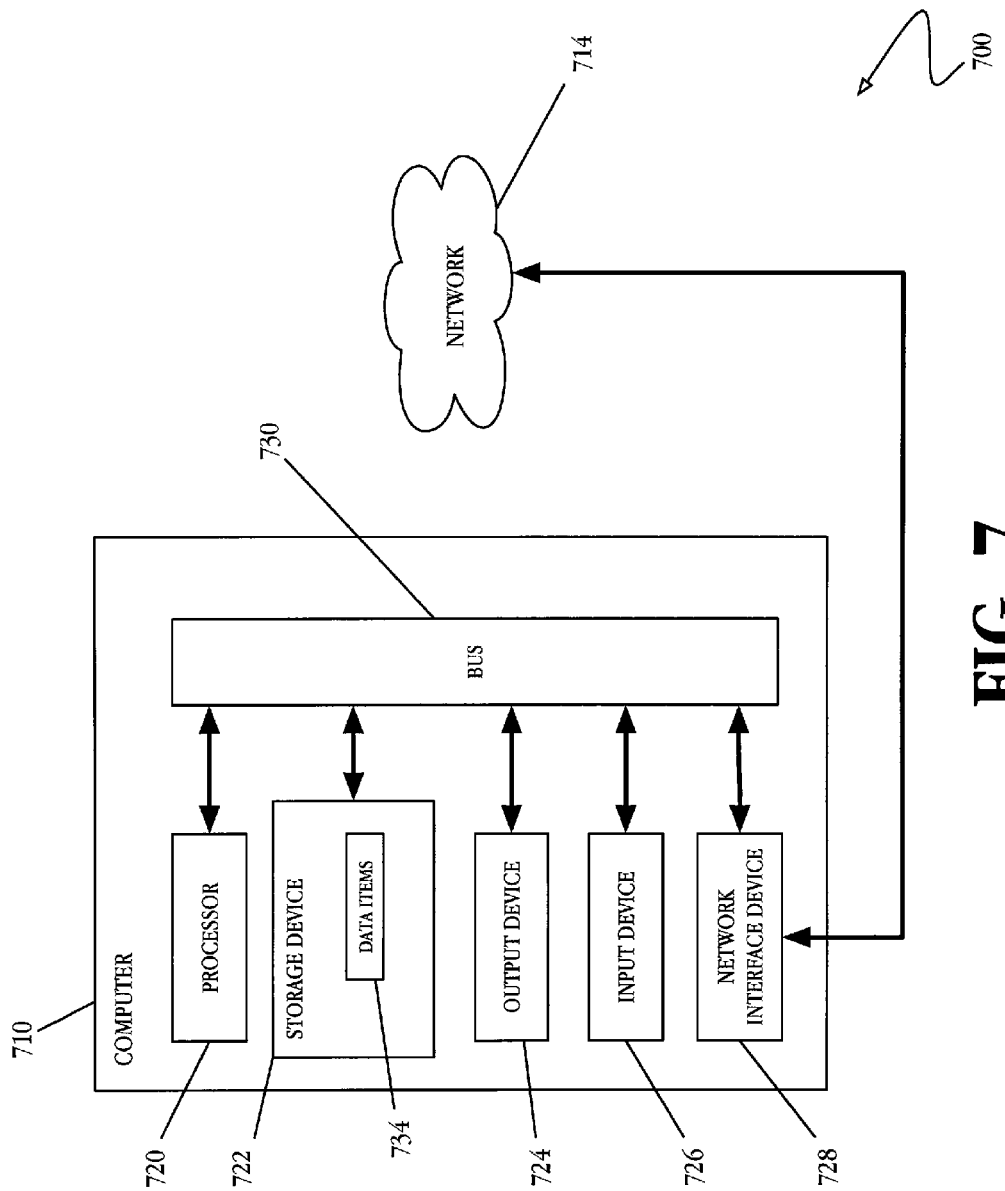
FIG. 7 shows a block diagram of a machine including instructions to perform any one or more of the methodologies described herein.

FIG. 7 shows a block diagram of a machine including instructions to perform any one or more of the methodologies described herein. A system 700 includes a computer 710 connected to a network 714. The computer 710 includes a processor 720, a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 710 that controls the operation of the entire computer. Although not depicted in FIG. 7, the processor 720 typically includes a control unit that organizes data and program storage in memory and transfers data and other information between the various parts of the computer 710. The processor 720 receives input data from the input device 726 and the network 714 reads and stores code and data in the storage device 722 and presents data to the output device 724.

Although the computer 710 is shown to contain only a single processor 720 and a single bus 730, the disclosed embodiment applies equally to computers that may have multiple processors and to computers that may have multiple busses with some or all performing different functions in different ways.

The storage device 722 represents one or more mechanisms for storing data. For example, the storage device 722 may include read-only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although the computer 710 is drawn to contain the storage device 722, it may be distributed across other computers, for example on a server.

The storage device 722 includes a controller (not shown in FIG. 7) and data items 734. The controller includes instructions capable of being executed on the processor 720 to carry out the functions, as previously described above with reference to FIGS. 1-6. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. Of course, the storage device 722 may also contain additional software and data (not shown), which is not necessary to understand the invention.

Although the controller and the data items 734 are shown to be within the storage device 722 in the computer 710, some or all of them may be distributed across other systems, for example on a server and accessed via the network 714.

The output device 724 is that part of the computer 710 that displays output to the user. The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, voice recognition device, or any other appropriate mechanism for the user to input data to the computer 710 and manipulate the user interface previously discussed. Although only one input device 726 is shown, in another embodiment any number and type of input devices may be present.

The network interface device 728 provides connectivity from the computer 710 to the network 714 through any suitable communications protocol. The network interface device 728 sends and receives data items from the network 714.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted.

The network 714 may be any suitable network and may support any appropriate protocol suitable for communication to the computer 710. In an embodiment, the network 714 may support wireless communications. In another embodiment, the network 714 may support hard-wired communications, such as a telephone line or cable. In another embodiment, the network 714 may support the Ethernet IEEE (Institute of Electrical and Electronics Engineers) 802.3x specification. In another embodiment, the network 714 may be the Internet and may support IP (Internet Protocol). In another embodiment, the network 714 may be a local area network (LAN) or a wide area network (WAN). In another embodiment, the network 714 may be a hotspot service provider network. In another embodiment, the network 714 may be an intranet. In another embodiment, the network 714 may be a GPRS (General Packet Radio Service) network. In another embodiment, the network 714 may be any appropriate cellular data network or cell-based radio network technology. In another embodiment, the network 714 may be an IEEE 802.11 wireless network. In still another embodiment, the network 714 may be any suitable network or combination of networks. Although one network 714 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A non-transitory machine-readable medium for routing an inbound communication comprising instructions, which when executed by a machine, cause the machine to execute the following software modules:
    a call handling module to receive inbound communications from a user; and
    a routing decision engine to select an agent to process the inbound communication using at least a present expressed need of the user to pay a balance on a credit card and one or more determined unexpressed needs of the user, based on specific information of the user and general demographic information, wherein demographic information includes aggregated information of one or more groups of users which the user has contact with, wherein the aggregated information is related to the specific information of the user and retrieved from third party data resources, and to send instructions to the call handling module to route the inbound communication to the selected agent.

2. The machine-readable medium of claim 1, wherein the instructions incorporate the communications address of the selected agent.

3. The machine-readable medium of claim 1, further comprising:
    a user data store to maintain data used to determine the one or more unexpressed needs of the user.

4. The machine-readable medium of claim 3, wherein the one or more unexpressed needs of the user includes at least one of the following:
    past product purchases;
    credit history;
    credit rating;
    demographic information;
    product utilization;
    third party product utilization; and
    third party customer information.

5. A non-transitory machine-readable medium for processing a communication comprising instructions, which when executed by a machine, cause the machine to:
    receive an inbound communication from a user;
    parse from the inbound communication an expressed need by a user to pay a balance on a credit card;
    determine an unexpressed need of the user based on specific information of the user and general demographic information, wherein demographic information includes aggregated information of one or more groups of users which the user has contact with, wherein the aggregated information is related to the specific information of the user and retrieved from third party data resources; and
    processing the inbound communication using at least a combination of the present need and the unidentified need.

6. The machine-readable medium of claim 5, wherein determining the unexpressed need includes determining, at a user data store, the unexpressed need, and the user data store contains at least one of the following:
    information about the products utilized by the user;
    information associated directly with the user, the information associated directly with the user obtained by a direct relationship with the user;
    information associated indirectly with the user, the information associated indirectly with the user obtained from outside the direct relationship with the user; and
    information aggregated from one or more other users, either associated directly or indirectly with the other users.

7. The machine-readable medium of claim 5, wherein processing includes:
    routing the call to a cross-functional grouping of one or more call center agents using at least the combination of the present need and the unexpressed need.

8. The machine-readable medium of claim 7, wherein the cross-functional grouping of one or more call center agents are trained across functional business areas.

9. The machine-readable medium of claim 8, wherein the functional business areas include at least one of the following:
    financial planning;
    life insurance;
    homeowner's insurance;
    banking services;
    equity lending services;
    auto insurance;
    casualty insurance;
    health insurance; and
    brokerage services.

10. The machine-readable medium of claim 8, wherein the functional business area is one in which a call center agent in such a business area requires certification to functionally interact with customers.

11. The machine-readable medium of claim 5, wherein processing the inbound communication includes routing the inbound communication to an agent capable of responding to the present need and the unexpressed needs within a single interaction with the user.

* * * * *